United States Patent [19]
Gu et al.

[11] Patent Number: 5,666,566
[45] Date of Patent: Sep. 9, 1997

[54] CAMERA HAVING AN AUTOMATIC FOCUS SYSTEM

[75] Inventors: Bon-jeng Gu; Jin-ki Lee, both of Kyeongsangnam-do, Rep. of Korea

[73] Assignee: Samsung Aerospace Industries, Ltd., Kyeongsangnam, Rep. of Korea

[21] Appl. No.: 477,516

[22] Filed: Jun. 7, 1995

[30] Foreign Application Priority Data

Jun. 10, 1994 [KR] Rep. of Korea ............... 94-13110

[51] Int. Cl.$^6$ .............. G03B 17/00; G03B 3/10
[52] U.S. Cl. .............. 396/80; 396/121
[58] Field of Search .............. 354/402, 403, 354/406, 407; 396/80–82, 121–123, 72, 89

[56] References Cited

U.S. PATENT DOCUMENTS

| | | |
|---|---|---|
| 4,800,409 | 1/1989 | Matsuda et al. . |
| 5,151,583 | 9/1992 | Tokunaga et al. . |
| 5,264,892 | 11/1993 | Nonaka et al. ............... 354/403 |
| 5,305,046 | 4/1994 | Sato ............... 354/402 |
| 5,313,245 | 5/1994 | Konishi ............... 354/402 |
| 5,321,460 | 6/1994 | Yoshida ............... 354/403 |
| 5,373,343 | 12/1994 | Nonaka ............... 354/403 |
| 5,386,263 | 1/1995 | Kotani et al. ............... 354/403 |

*Primary Examiner*—Safet Metjahic
*Assistant Examiner*—Eric Nelson
*Attorney, Agent, or Firm*—Finnegan, Henderson, Farabow, Garrett & Dunner, L.L.P.

[57] ABSTRACT

A camera having a automatic focus system for focusing a lens on an object to be photographed which comprises a device for measuring a plurality of distances between the object and the camera. The camera determines an auto focus distance based on a selected one of the predetermined conditions each representing a relationship between each of a plurality of measured distances under a respective circumstance. The camera controls the movement of the lens at least partially based on the auto focus distance.

10 Claims, 5 Drawing Sheets

000
CAMERA HAVING AN AUTOMATIC FOCUS SYSTEM

BACKGROUND OF THE INVENTION

1. Field of the Invention

The present invention relates generally to a camera having a multi automatic focus adjusting system and a method of adjusting focus.

2. Description of the Related Art

An autofocus (AF) camera measures the distance from the camera to a lens either actively or passively. In the active mode, the camera emits light or ultrasonic waves toward the object, detects the returning waves from the object and then calculates the distance from the object based on the detected result. In the passive mode, under natural lighting, the camera receives light emitted or reflected from the object passively and determines whether the focus is correct using the contrast or the phase of the light.

Intermediate grade cameras commonly use active autofocus because the autofocus can be operated regardless of the light conditions and active autofocus has a lower expense. However, active autofocus may operate incorrectly if a reflecting surface such as a window is in front of the object. The emitted ultrared rays or ultrasonic waves can not transmit the window and the camera will focus incorrectly. Further, with known active autofocus systems, only the center positioned object is in focus and the surrounding scenery or character is photographed vaguely.

A camera system using active autofocus emits single light from a light emitting element/detects light reflected off of the object, measures the distance from the object based upon the reflected light, and then adjusts the focus. In that event, focus is only measured to center positioned objects, and not completely clear photographs are obtained.

To solve the above-mentioned problems, a multi automatic focus controlling system may be used in the camera. In such a system, the camera adjusts the focus automatically with respect to the entire object including the surrounding objects as well as the center positioned object in accordance with a plurality of light or ultrasonic waves detected by a plurality of light receiving elements.

U.S. Pat. No. 4,800,409, entitled "Control Device For Use In A Camera Having An Objective Lens," discloses a multi automatic focus controlling system which measures the distance from the object based on light emitted from a light emitting element and reflected off of the object, calculates a suitable AF step based on the above measuring result, and, if the interval of the AF step in accordance with each measured distance from the object is within one step, produces an AF step signal in accordance with the AF step stored in a first memorizing means.

U.S. Pat. No. 5,151,883, entitled "Focus Adjustment Device Having Restricting Means For Restricting A Selecting Action According To The Degree Of Nearness Of A Distance Measurement," discloses a camera in which the AF step is set up in accordance with the measured distance from an object which is the nearest object next to the central positioned object with respect to the camera when the measured distance from the central positioned object is smaller than the predetermined value, i.e., the central positioned object is too near the camera.

These cameras also have a disadvantage in that objects at different distances can not be photographed clearly because the cameras select information simply and perform the AF calculation based on the selected information.

SUMMARY OF THE INVENTION

In view of the above, it is an object of the present invention to provide a camera having an automatic focus system which solves the above cited problems of the related art and can photograph the surrounding object as well as the main objects clearly.

To achieve this object, according to an aspect of the present invention, a camera having an automatic focus system for focusing a lens on an object to be photographed, as embodied and broadly defined herein, comprises means for measuring a plurality of distances between the object and the camera; means, coupled to the measuring means, for determining an auto focus distance based on a selected one of predetermined conditions, each condition representing relationship between each of a plurality of measured distances under a respective circumstance; and means for controlling the movement of the lens at least partially based on said auto focus distance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION OF THE PREFERRED EMBODIMENTS

According to a preferred embodiment of the present invention, a camera has a multi automatic focus adjusting system. The camera measures a plurality of distance between an object and the camera, calculates the differences between each measured distance, classifies the calculation results into a plurality of sections, selects suitable distance information in accordance with several preset criteria, and performs the AP calculation, so that surrounding objects yell as the main object can be photographed clearly.

Figure 1:
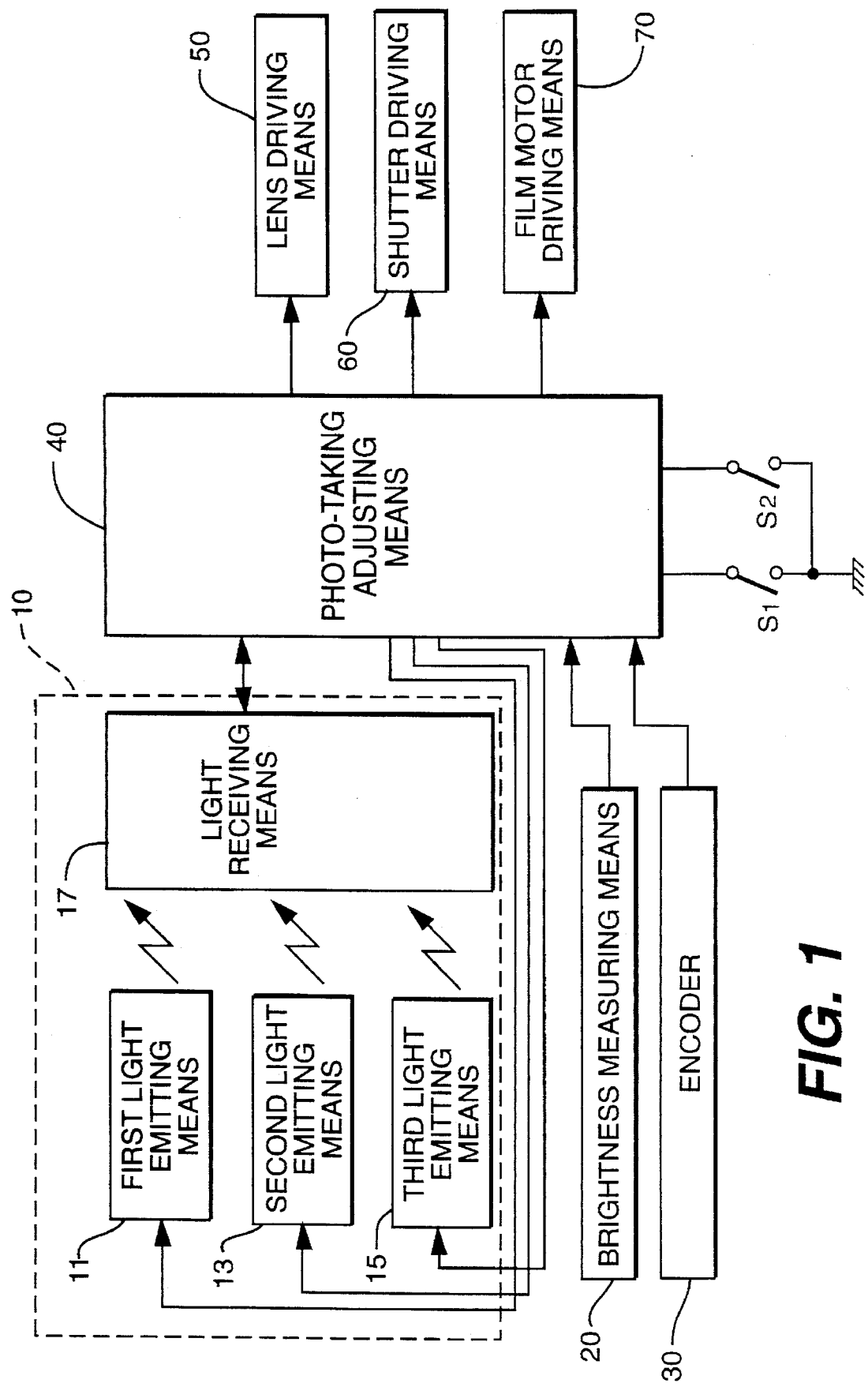
FIG. 1 is block diagram showing the structure of a camera of the present invention having a multi automatic focus controlling function.
Figure 2A:
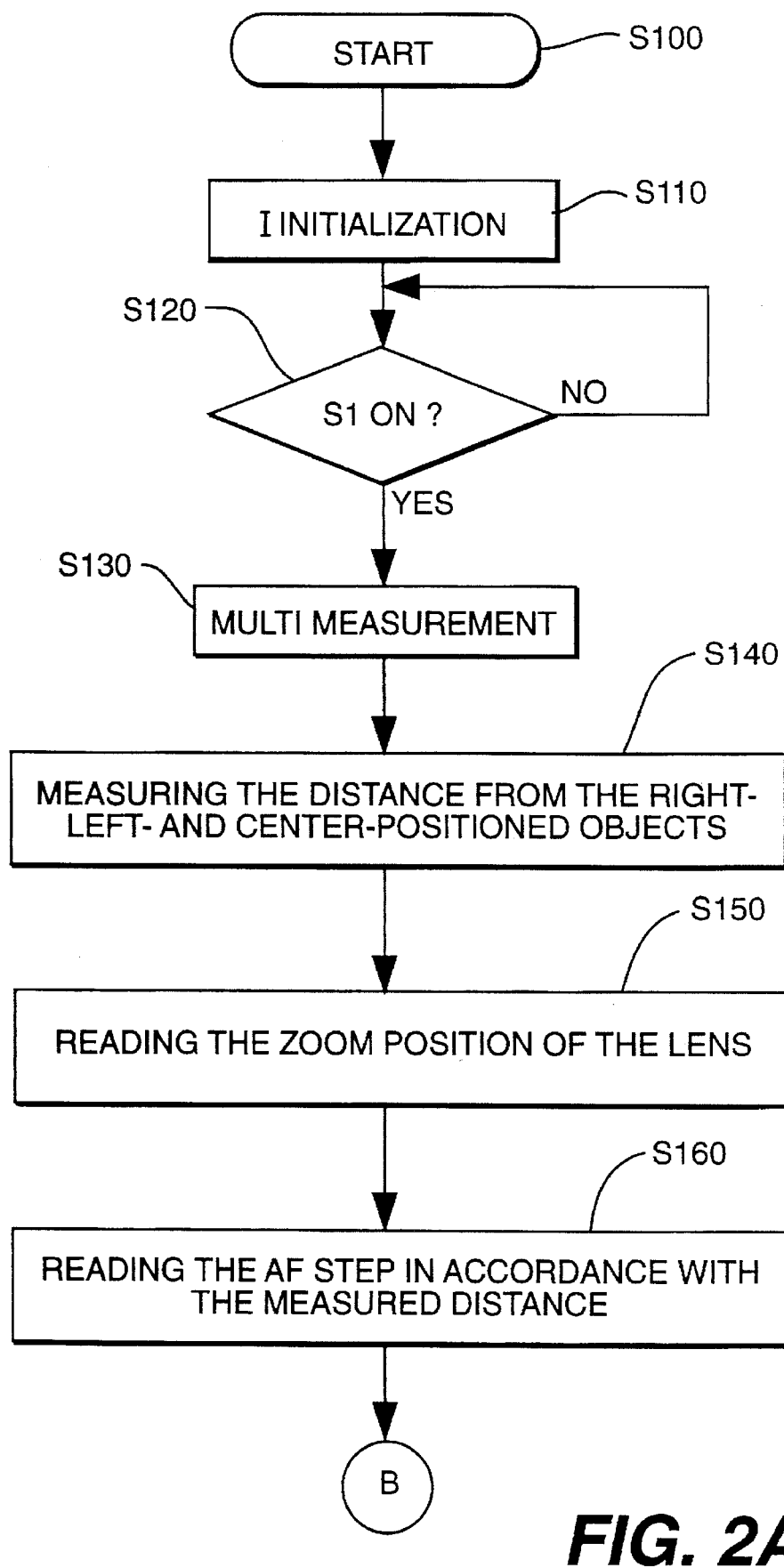
FIGS. 2A, 2B, and 2C are flowcharts explaining the operation of the camera of the present invention having the multi automatic focus controlling function.
Figure 2B:
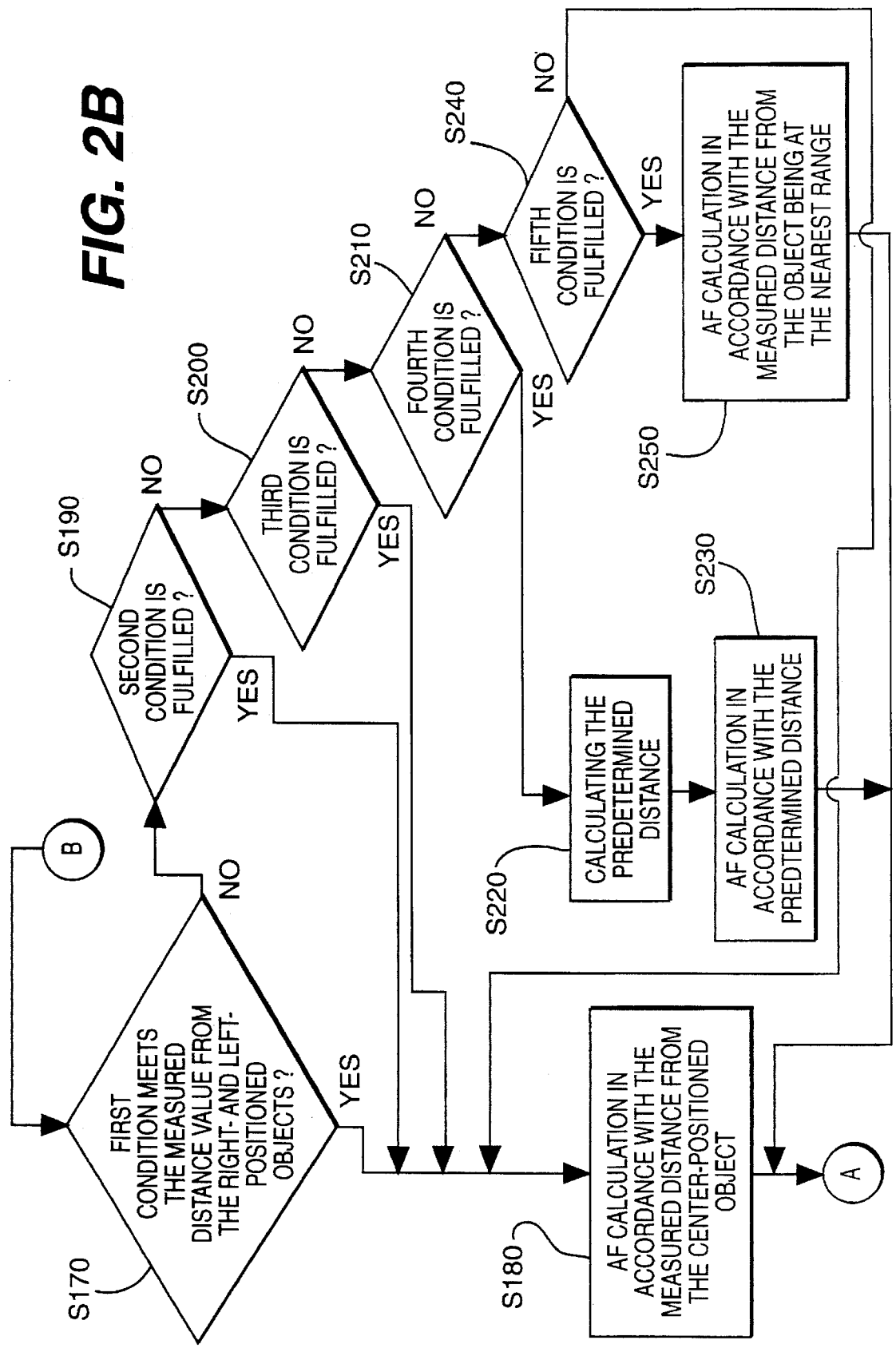
Figure 2C:
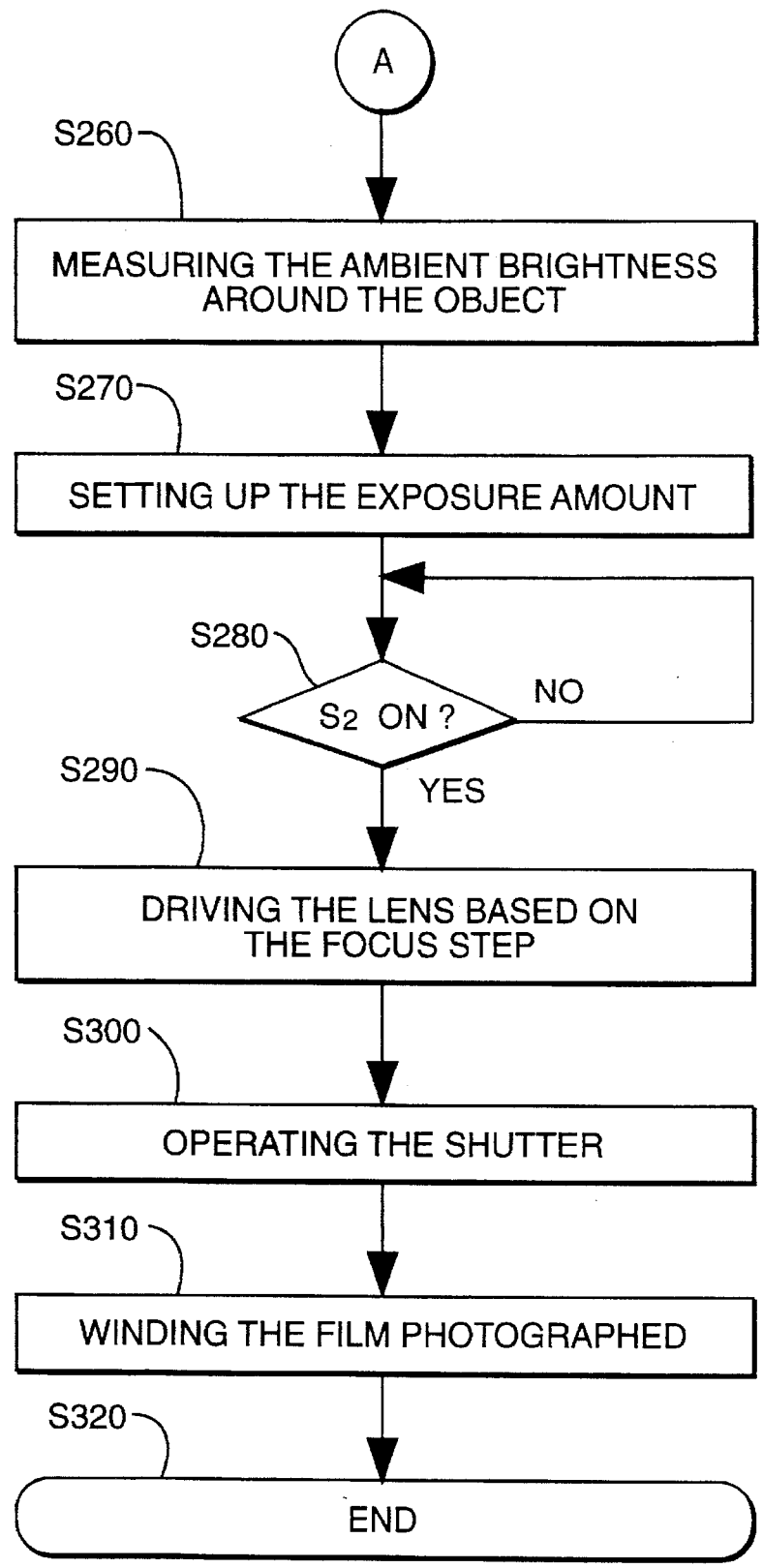

FIG. 1 is a block diagram of a camera having a multi automatic focus controlling function of the present invention; FIGS. 2A and 2B are flowcharts explaining the operation camera having the multi automatic focus controlling function of the present invention; and FIGS. 3A to 3E are diagrams showing the conditions of the object distance for operating the AF calculation of the camera having the multi automatic focus controlling function of the present invention.

Referring to FIG. 1, a camera having the multi automatic focus adjusting system includes a first step release switch S1, and a second step release switch S2. An automatic distance measuring means 10, having a plurality of light emitting elements and a plurality of light receiving elements, measures a plurality of distances between an object to be photographed and the camera. A brightness measuring means 20 measures the ambient brightness around the object. An encoder 30 detects the zoom position of a lens. A photo-taking adjusting means 40 is connected to the release switches S1 and S2, the automatic distance measuring lens 10, the brightness measuring means 20, and the output terminal of the encoder 30. The photo-taking adjusting means 40 adjusts the focus in accordance with the distances from the object and controls the operation of photographing in response to the above. A lens driving means 50, connected to the output terminal of the photo-taking adjusting means, moves the lens. A shutter driving means 50, connected to the output terminal of the photo-taking adjusting means 40, adjusts the amount of exposure. A film motor driving means 60, connected to the output terminal of the photo-taking adjusting means, winds and rewinds film.

In the automatic distance measuring means 10, a first lift emitting means 11 measures the distance from a left positioned object; a second light emitting means 13 measures the distance from a center positioned object; and a third light emitting means 15 measures the distance from a right positioned object. A light receiving means has a plurality of light receiving elements for receiving light emitted from the light emitting means 11–15 and reflected off of the objects.

The AF system for measuring the distance is preferably a three beam active system using three light emitting elements.

Referring to FIGS. 3A to 3E, the conditions of each object imaged on either the left, right, or center is shown. Each spot represents an object. The section from a to b denotes a possible photographing range with respect to the left or right positioned object. The distance from a to b represents the depth of field or AF step. The position horizontally on the sheet, denotes each object being on the left, right, or center. The filled-in spot denotes the selected main object for performing the AF calculation.

The operation of the camera system having the multi automatic focus adjusting function, according to the preferred embodiment of this invention, is described below:

Provided power is applied to the camera, the photo-taking adjusting means 40 initializes the operating circuits and the variables (S110) and then determines whether the first-step release switch S1 is operated (S120).

When a photographer pushes a release button (not shown in the figure) to take a photograph of the desired object, the first step release switch S1 becomes on. In the above, if the first step release switch is operated, the photo-taking adjusting means 40 directs the automatic distance measuring means 10 to measure the distance from the object (S130 to S140).

To measure the distance from the object to be photographed, the photo-taking adjusting means 40 operates each light emitting means of the automatic distance measuring means 10 in turn and measures the distances from the objects on the right, left, and center, respectively.

Next, ultraviolet rays are emitted from the light emitting means 11, 13, and 15 and reflected from each object. The reflected light is input to the light receiving means 17. Thereafter, the light receiving means 17 outputs current generated by the input light on the photo-taking adjusting means 40.

Then, the light receiving means 17, having light receiving elements, in accordance with each light emitting means, detects the light emitted from the light emitting means by the corresponding light emitting elements and measures the current generated by the light receiving elements. The photo-taking adjusting means 40 calculates the distance from the object based on the measured current value.

It is noted that the light receiving element 17 includes a plurality of light receiving elements for detecting the light emitted from each light emitting means. The photo-taking adjusting means 40 reads the current zoom position of the lens, (not shown in the figure). The encoder 30 measures the distance from the center positioned object. Then, if the above operation is completed, the photo-taking adjusting means 40 reads the measured distance from the object and the AF step in accordance with the zoom position of the lens (S150 to S160).

In other words, the photo-taking adjusting means 40 reads the measured distance from the left positioned object and the AP step in accordance with the zoom position of the lens using the first light emitting means 11; reads the measured distance from the center positioned object and the AP step in accordance with the zoom position of the lens using the second light emitting means 13; and reads the measured distance from the right positioned object and the AF step in accordance with the zoom position of the lens using the third light emitting means 15.

In the above, the photo-taking adjusting means 40 determines whether the measured distance value meets any of five conditions shown in the accompanying FIGS. 3A–3D, and sets up the proper focus step based on that result so as to take a photograph clearly in accordance with the measured distance value with respect to the object.

As the first condition, the photo-taking adjustment means 40 determines whether the measured distance value from the object on the left or right is beyond a photographing range. This range is the effective reaching distance of the ultraviolet rays emitted from the light emitting means, reflected from the object, and detected by the light receiving means.

Figure 3A:
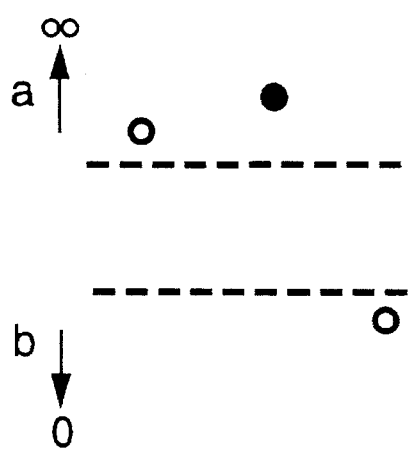
FIGS. 3A to 3E are diagrams showing the conditions of the object distance for operating AP calculation of the camera of the present invention having the multi automatic focus controlling function.

FIG. 3A shows a state meeting the first condition (S170). The distance value measured from the left or right object is out of photographing range. In this case, the photo-taking adjustment means 40 sets the predetermined AF step in accordance with the measured distance from the center positioned object and performs the AF calculation to adjust the focus based on the center positioned object (S180).

Figure 3B:
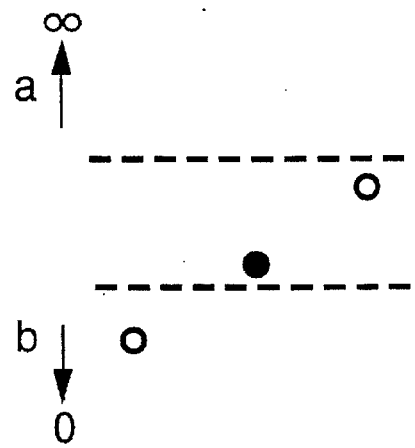

If the current measured distance from the object does not meet the first condition, the photo-taking adjusting means 40 determines whether it meets the second condition (S190). FIG. 3B shows a state meeting the second condition. In the second condition, a right or left object is within the photographing range and the center positioned object is also within the range and closer to the camera than the right or left positioned object. If the second condition is met, the AF calculation is performed in accordance with the measured distance from the center positioned object (S180). That is why, even though one of the right and left positioned is within the possible photographing range, and the center positioned object is closer to the-camera that the right and left positioned objects, the surrounding object as well as the center positioned object is photographed clearly if the center positioned object is focused.

Figure 3C:
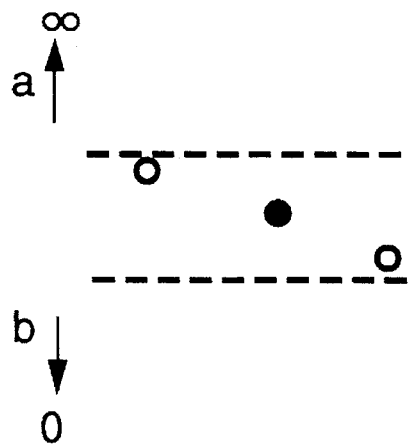

FIG. 3C shows a state meeting the third condition. All three spots are within the depth of field range a to b. The first predetermined value has four steps. If the difference between the AF step in accordance with the left and right positioned objects and the AF step in accordance with the center positioned object is less than four steps, the AF step is performed in accordance with the distance from the center positioned object (S180).

If the current measured distance from the object does not meet the third condition, the photo-taking adjusting means 40 determines whether it meets the fourth condition. In the fourth condition, each Measured distance from the right, and left, is completely within the range. However, the center positioned object is at the longest range, and the difference between the AF step in accordance with the distances from the right and left positioned objects and the AF step in accordance with the distance from the center positioned object is larger than a first predetermined value and smaller than a second predetermined value.

The predetermined value in accordance With this embodiment has nine steps.

Figure 3D:
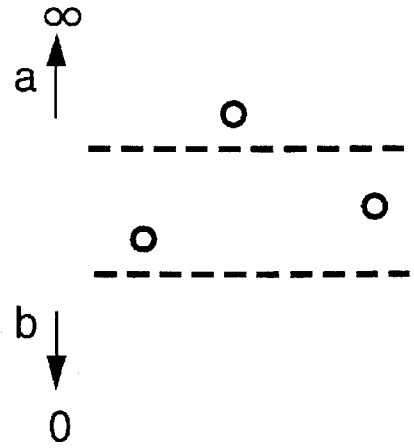

FIG. 3D shows an example where the fourth condition is fulfilled. If the fourth condition is fulfilled, the photo-taking adjustment means 40 performs the AF calculation in accordance with the following equation:

$$\text{predetermined condition} = (A+B)/2+C, \text{ wherein:}$$

A is the AF step in accordance with the measured distance from the center positioned object at the longest range;

B is the AF step in accordance with the measured distance from an object at the closest range with respect to the camera of the left and right positioned objects; and C is a correction value.

If the current measured distance from the object does not meet the fourth condition, the photo-taking adjusting means 40 determines whether it meets the fifth condition (S240). In the fifth condition, each measured distance from the right, and left, is completely within the range. However, the center positioned object is at the longest range, and the difference between the AP step in accordance with the distances from the right and left positioned objects and the AF step in accordance with the distance from the center positioned object is more than second predetermined value. Thus, the fifth condition is fulfilled in this embodiment if the difference between the AF step in accordance with the right and left positioned objects and the AF step in accordance with the center positioned object is more than nine steps.

Figure 3E:
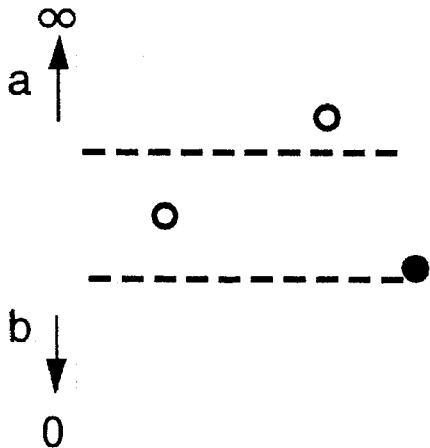

FIG. 3E shows an example where the fifth condition is fulfilled. When the fifth condition is fulfilled, it is impossible to take a photograph of the right and left positioned objects clearly with the center positioned object focused. In FIG. 3E, the center positioned object is at long range, while the right and left positioned objects are at close range.

Accordingly, the photo-taking adjusting means 40 performs the AF calculation in accordance with the measured distance from an object closest to the camera when the measured distance from the plurality of objects fulfills the fifth condition (S250).

If the current measured distance from the object does not meet any of the five conditions, the photo-taking adjusting means 40 performs the AF calculation in accordance with the center positioned object.

The photo-taking adjusting means 40 measures the ambient brightness around the object with the brightness measuring means 20 after setting up the driving step based on the result of the AF calculation in accordance with the measured distance from the object as above.

Next, the photo-taking adjusting means 40 determines the proper value amount based on the measured distance from the object and the ambient brightness around the object as illustrated in S270 and determines whether the second step release switch S2 is operated as illustrated in S280.

Then, the photo-taking adjusting means 40 operates the lens driving means 50 and moves the lens a predetermined step in accordance with the AP calculation as illustrated in S290, operates the shutter driving means 60 based on the predetermined exposure value, and takes a photograph as illustrated in S300.

After taking a photograph, the photo-taking adjusting means 40 operates the film motor driving means 70, winds one cut of exposed film and completes the photographing routine as illustrated in S310 to S320.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A camera having an automatic focus adjusting system for focusing a lens on an object to be photographed, comprising:

means for measuring at least three discrete distances between the object and the camera;

means for calculating the differences between each measured distance;

means for calculating a focus step for each measured distance, each focus step being dependant upon the measured distance and the focal length of the lens; and means for determining a focus position of the lens based upon the measured distances, the calculated differences, and the calculated focus steps.

2. The camera of claim 1.9, wherein said at least three measured distances include a right distance representing a measured distance between the camera and the right side of the object, a left distance representing a measured distance between the camera and the left side of the object, and a center distance representing a measured distance between the camera and the center of the object between the right and left sides of the object.

3. The camera of claim 2, wherein said determining means includes means for checking a condition whether the right and left distances are within a focus step and the center distance is outside the focus step; and means for calculating the focus position based on the center distance if said condition is met.

4. The camera of claim 2, wherein said determining means includes means for checking a condition whether one of the right and left distances is within a focus step and whether the center distance is within the focus step and shorter than the right and left distances; and means for calculating the focus position based on the center distance if said condition is met.

5. The camera of claim 2, wherein said determining means includes means for checking a condition whether the right, left, and center distances are within a focus step and whether the differences between each of the focus steps for the right and left distances and the focus step for the center distance is less than a first predetermined value; and means for calculating the auto focus distance based on the center distance if said condition is met.

6. The camera of claim 2, wherein said determining means includes means for checking a condition whether the right and left distances are within a focus step while the center distance is beyond the focus step, and whether the difference between each of the focus steps for the right and left distances and the focus step representing the center distance is within a predetermined range; and means for calculating the focus based on the following equation if said condition is met:

$$(A+B)/2+C, \text{ wherein}$$

A is the focus step for the center distance;

B is the focus step for the shorter of the left and right distances; and

C is a correction value.

7. The camera of claim 2, wherein said determining means includes means for checking a condition whether the right and left distances are within a focus step while the center distance is beyond the focus step and whether the difference between each of the focus steps for the right and left distance and the focus step for the center distance is greater than a predetermined value; and means for calculating the focus position based on the shortest of the right, left and center distances if said condition is met.

8. The camera of claim 2, wherein said determining means includes means for checking:

- a first condition whether the left and right distances are within a focus step and the center distance is within the focus step; and means for calculating the focus based on the center distance if said first condition is met;
- a second condition whether one of the right and left distances is within a focus step and whether the center distance is within the focus step while shorter than the right and left distances; and means for calculating the focus position based on the center distance if said second condition is met;
- a third condition whether the right, left, and center distances are within a focus step and whether the difference between each of the focus steps for the right and left distances and the focus step for the center distance is less than a first predetermined value; and means for calculating the focus position based on the center distance if said third condition is met;
- a fourth condition whether the right and left distances are within a focus step while the center distance is beyond the focus step and whether the difference between each of the focus steps representing the right and left distances and the focus step representing the center distance is larger than the first predetermined value; and means for calculating the focus position based on the following equation if said fourth condition is met;

(A+B)/2+C, wherein

A is the focus step for the center distance;

B is the focus step for the closer of the left and right distances with respect to the camera; and C is a correction value; and a fifth condition whether the right and left distances are within a focus step while the center distance is beyond the focus step and whether the difference between each of the focus steps for the right and left distances and the focus step for the center distance is greater than the second predetermined value; and means for calculating the focus position based on the shortest of the right, left, and center distances, if said fifth condition is met.

9. In a camera having an automatic focus adjusting system, a method for focusing a lens on an object to be photographed, the method comprising the steps of:

measuring at least three discrete distances between the object and the camera;

calculating the differences between each measured distance;

calculating a focus step for each measured distance, each focus step being dependant upon the measured distance and the focal length of the lens; and determining a focus position of the lens based upon the measured distances, the calculated differences, and the calculated focus step.

10. The camera of claim 2, wherein the means for measuring comprises three light emitting elements for measuring the left, right, and center distances.

* * * * *

UNITED STATES PATENT AND TRADEMARK OFFICE
CERTIFICATE OF CORRECTION

PATENT NO. : 5,666,566
DATED : September 9, 1997
INVENTOR(S) : Bon-jeng GU et al.

It is certified that error appears in the above-indentified patent and that said Letters Patent is hereby corrected as shown below:

Title page, Item [57], in the Abstract, line 1,
" a automatic" should read --an automatic--.

Claim 2, column 6, line 29, "1.9" should read
--1--.

Signed and Sealed this

Eleventh Day of August 1998

Attest:

BRUCE LEHMAN

*Attesting Officer*   *Commissioner of Patents and Trademarks*